US008271558B1

(12) United States Patent  (10) Patent No.: US 8,271,558 B1
Caklovic  (45) Date of Patent: Sep. 18, 2012

(54) CREATING A UNIFICATION DIRECTORY THAT UNIFIES A PLURALITY OF FILE SYSTEM DIRECTORIES

(75) Inventor: Nenad Caklovic, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 669 days.

(21) Appl. No.: 12/393,684

(22) Filed: Feb. 26, 2009

(51) Int. Cl.
*G06F 17/30* (2006.01)

(52) U.S. Cl. .................................. 707/828; 707/781

(58) Field of Classification Search .......... 707/802–808, 707/821–832
See application file for complete search history.

(56) References Cited

U.S. PATENT DOCUMENTS

| 6,081,898 | A | 6/2000 | Miller |
| 6,195,650 | B1 | 2/2001 | Gaither |
| 6,381,615 | B2 | 4/2002 | Gaither |
| 7,047,257 | B2 * | 5/2006 | Fletcher et al. ................. 1/1 |
| 7,337,171 | B2 | 2/2008 | Gimpl |
| 7,587,471 | B2 * | 9/2009 | Yasuda et al. ............... 709/220 |
| 7,885,974 | B2 * | 2/2011 | Fairchild et al. ............. 707/783 |
| 2004/0133606 | A1 * | 7/2004 | Miloushev et al. .......... 707/200 |
| 2006/0173919 | A1 * | 8/2006 | Owen Rees et al. ....... 707/104.1 |
| 2007/0067321 | A1 | 3/2007 | Bissett |
| 2007/0220029 | A1 * | 9/2007 | Jones et al. .................... 707/101 |
| 2009/0077141 | A1 * | 3/2009 | Hady et al. ................... 707/204 |
| 2009/0198704 | A1 * | 8/2009 | Landberg ........................ 707/10 |

OTHER PUBLICATIONS

"Unionfs: User- and Community-Oriented Development of a Unification File System," Quigley et al., In: Proceedings of 2006 Ottawa Linux Symposium, Ottawa, Canada, 2006, pp. 349-362.
"Versatility and Unix Semantics in Namespace Unification" Wright et al., ACM Transactions on Storage (TOS), vol. 2, Issue 1, Feb. 2006, pp. 74-105.

* cited by examiner

*Primary Examiner* — Fred I Ehichioya
*Assistant Examiner* — Michelle Owyang
(74) *Attorney, Agent, or Firm* — Meyertons, Hood, Kivlin, Kowert & Goetzel, P.C.

(57) ABSTRACT

Various embodiments of a system and method for creating a unification directory to unify a group of directories are described herein. The system may enable a first directory to be unified with one or more other directories such that when directory operations are performed on the first directory, it appears to them that the first directory includes not only its own files, but also the files of the one or more other directories. This may be accomplished by creating a persistent, re-useable unification directory which includes directory entries corresponding to the names of the files in the first directory and the one or more other directories. The unification directory does not contain complete copies of the files. Instead, the unification directory is used to obtain a listing of the files when needed, and the system then re-directs file operations to the real files in the individual directories as necessary.

12 Claims, 6 Drawing Sheets

CREATING A UNIFICATION DIRECTORY THAT UNIFIES A PLURALITY OF FILE SYSTEM DIRECTORIES

BACKGROUND OF THE INVENTION

1. Field of the Invention

This invention relates to computer software. More particularly, the invention relates to a system and method for creating a unification directory that unifies a plurality of file system directories.

2. Description of the Related Art

Computer systems generally store files on storage devices such as disk drives, where the files are managed by a file system. A file system typically includes a plurality of directories which are organized in a hierarchy. For example, the file system may have a root directory, the root directory may have sub-directories, and the sub-directories of the root directory may in turn have sub-directories, etc. Each file in the file system may be specified by a pathname that indicates the hierarchical sequence of directories that lead to the file. For example, a pathname such as "/dir1/dir2./filename.txt" indicates that a file named "filename.txt" is located in a directory named "dir2". The "dir2" directory is in turn located in another directory named "dir1", which is located in the root directory of the file system.

For each file, the file system stores a set of data blocks for the file (i.e., the actual data stored in the file by a user or application), as well as metadata for accessing and managing the file. For example, in Unix and Unix-derived file systems, file metadata is often stored in modes. The mode for a file stores information about the file, such as the number of bytes in the file, protection and permission information, addresses of data blocks for the file's data, the dates and times when the file was created, last accessed, and modified, etc. The mode may also store information about the mode itself, such as an mode number that identifies the mode and possibly an mode version number.

Each directory in the file system may include a table of directory entries that maps the names of the files and sub-directories in that directory to their corresponding modes (or other file metadata structures). In some file systems, a directory is implemented as a special type of file that simply lists the directory entries. For each file in the directory, the directory entry for the file simply maps the name of the file to the mode number of the file's mode. A software application may access a file if it knows the pathname of the file. For example, the sequence of directories leading to the file may be traversed until the file's directory is reached, and the directory entries of the directory may be consulted to map the name of the file to the file's corresponding mode. The file's mode may then be accessed, and the information stored therein may be used to access the file. For example, as noted above, the mode may store addresses of data blocks (e.g., data blocks on a disk drive or other storage device) that hold the file's data. Thus, the data blocks may be accessed, for example, to read data from the file or to append new data to the file.

Figure 1:
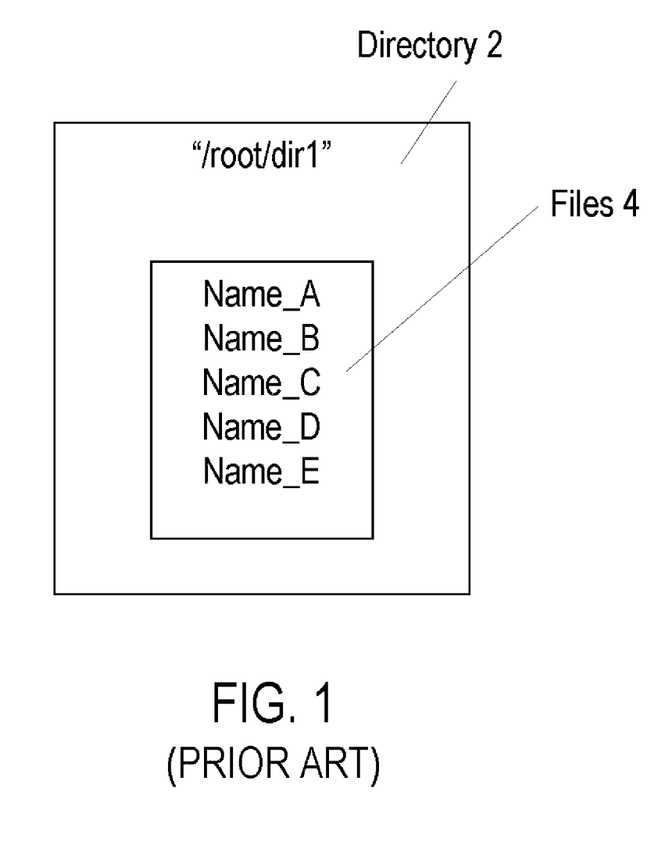
FIG. 1 (Prior Art) illustrates an example of a directory including five files.
Figure 2:
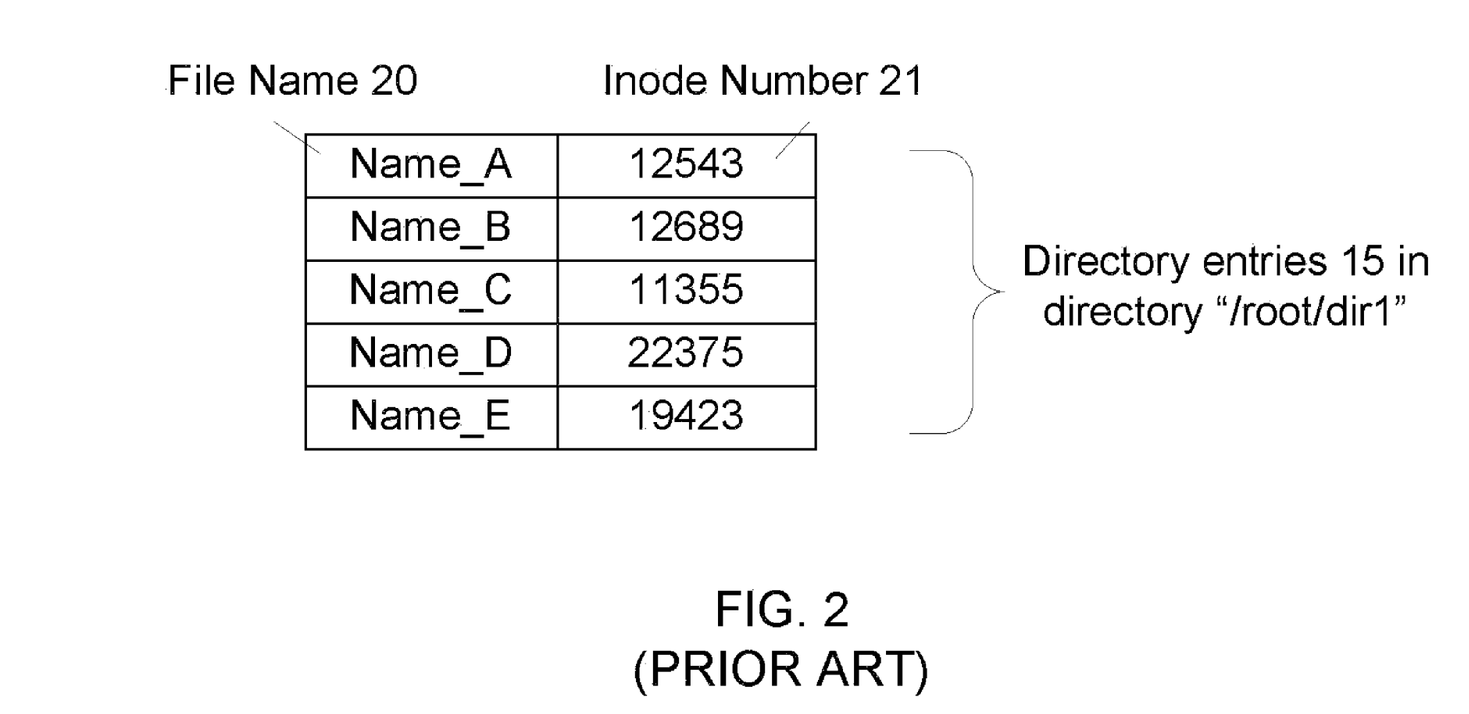
FIG. 2 (Prior Art) illustrates a table of directory entries in the directory of FIG. 1.

FIG. 1 illustrates an example of a directory 2 specified by the pathname "/root/dir1". The directory 2 includes files 4 named "Name_A", "Name_B", "Name_C", "Name_D", and "Name_E". FIG. 2 illustrates a table of directory entries 15 for the "/root/dir1" directory 2. As discussed above, the table includes a respective directory entry for each of the files in the directory which maps the name 20 of the file to the mode number 21 of the mode for the file.

Figure 3:
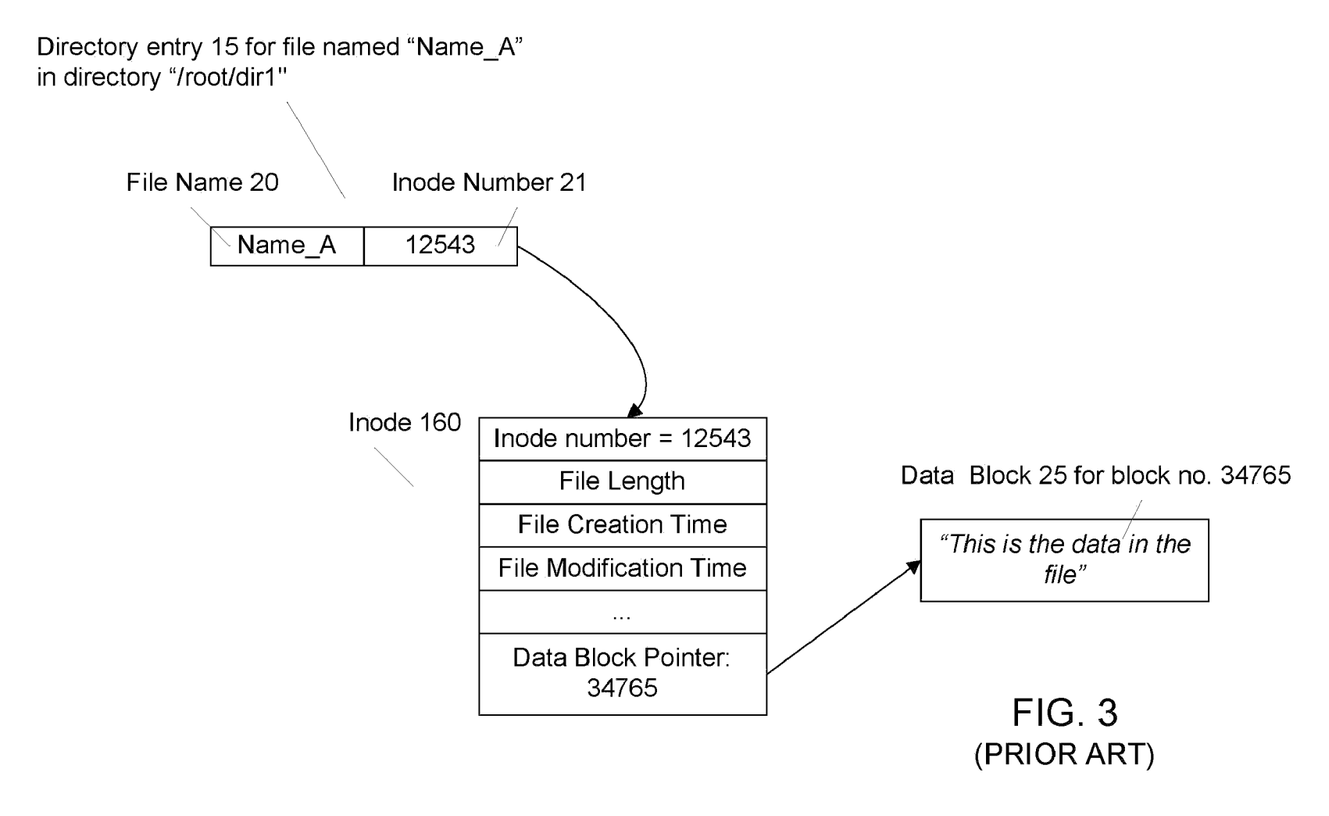
FIG. 3 (Prior Art) illustrates a directory entry and mode for a particular file in the directory of FIG. 1.

FIG. 3 illustrates the directory entry 15 for the file named "Name_A" in the "/root/dir1" directory. The directory entry 15 maps the name 20 of the file (i.e., "Name_A") to an mode number 21, i.e., "12543" in this example. In other words, the mode having the mode number 12543 is the mode that corresponds to the file named "Name_A" and stores information about the file named "Name_A".

FIG. 3 also illustrates the mode 160 having the mode number 12543, i.e., illustrates the mode 160 for the file named "Name_A". The mode 160 includes information specifying various attributes of the file, such as the length (number of bytes) of the file, the file creation time, the file modification time, etc. The mode 160 also specifies that data for the file is located at a data block 25 having the data block number 34765. For example, the data block number 34765 may refer to a data block or address of a disk drive or other storage device. FIG. 3 also illustrates the data block 25 having the data block number 34765, where the data block 25 includes data for the file. The mode 160 may also include various other attributes not illustrated in FIG. 3. Also, the mode 160 may specify multiple data blocks for the file or may indirectly point to data for the file by pointing to other data block pointers which point to data for the file.

For some applications it is necessary to unify a group of directories into a single directory. Consider an application that normally accesses a hardware driver file in a particular operating system directory. If the application is executed on a virtual computer instead of a real computer then it may be necessary to use a special driver file instead of the normal hardware driver file.

Suppose that the normal hardware driver file is named "display.sys" and is located in a directory, e.g., "/t/drivers". Suppose also that the special driver file has the same name as the normal hardware driver file and is located in another directory, e.g., "/v". The functionality of replacing the normal hardware driver file with the special driver file can be transparently achieved by configuring a unification of the directories "/t/drivers" and "/v" such that the "/t/drivers" appears to contain not only its own files, but also the files of the "/v" directory. A unification file system can implement the unification such that application programs are unaware that some of the files that appear to be in the directory "/t/drivers" are actually located in the "/v" directory. For example, if the "/v" directory contains a file named "foo.sys" then an application may request to access the file using the pathname "/t/drivers/foo.sys", and the unification file system will automatically intercept the request and redirect it to the "foo.sys" file in the "/v" directory. In the case of the special driver file, the "/t/drivers" directory already has a file named "display.sys". The unification may be configured so that the "/v" directory is given priority over the "/t/drivers" directory. Thus, when the application requests the file "/t/drivers/display.sys", the unification file system may intercept the request and redirect it to the "display.sys" file in the "/v" directory instead of the "display.sys" file in the "/t/drivers" directory.

Various systems known in the prior art enable a group of directories to be unified in the manner described above. For example, unification file systems (also called union file systems) may enable files and directories of separate file systems, known as branches, to be transparently overlaid, forming a single coherent file system. Contents of directories which have the same path within the merged branches will be seen together in a single merged directory, within the new, virtual file system. When mounting branches, the priority of one branch over the other is specified. Thus, when multiple branches contain a file with the same name, one gets priority over the others. Some application virtualization platforms also provide similar functionality enabling multiple directories to be unified, e.g., as in the virtual computer example discussed above.

Some prior art systems for unifying a group of directories operate to dynamically create a temporary merged view of the underlying directories in the group each time a merged view of the directories is needed. For example, each time a list of files in the merged directory needs to be obtained, these prior art systems may dynamically obtain a listing of the files in each of the individual directories in the group, and then merge the listings together. However, dynamically obtaining a merged listing in this manner is a relatively expensive operation to perform and may decrease the efficiency of the system.

SUMMARY

Various embodiments of a system and method for creating a unification directory to unify a group of file system directories including a first file system directory and one or more other file system directories are described herein. According to some embodiments, the method may comprise performing the following in response to a first request to perform a first operation on the first directory: creating a unification directory to unify the group of directories; for each file of each directory of the group of directories, creating a respective directory entry in the unification directory to represent the file; and using the directory entries in the unification directory to read a listing of file names to use for the first operation, where the listing of file names specifies each file of each directory of the group of directories.

The method may further comprise performing the following in response to a second request subsequent to the first request to perform a second operation on the first directory: determining that the unification directory already exists; and in response to determining that the unification directory already exists, using the directory entries created in the unification directory in response to the first operation to read the listing of file names to use for the second operation.

Some embodiments of the method may further comprise: after determining that the unification directory already exists, determining whether any of the directories of the group of directories has a modification time newer than a modification time of the unification directory. The second listing of files may be read from the unification directory in response to determining that none of the directories of the group of directories has a modification time newer than a modification time of the unification directory.

Some embodiments of the method may further comprise performing the following in response to a third request to perform a third operation on the first directory: determining that the unification directory already exists; determining whether any of the directories of the group of directories has a modification time newer than a modification time of the unification directory; and in response to determining that at least one of the directories of the group of directories does have a modification time newer than the modification time of the unification directory, re-creating the unification directory.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 4:
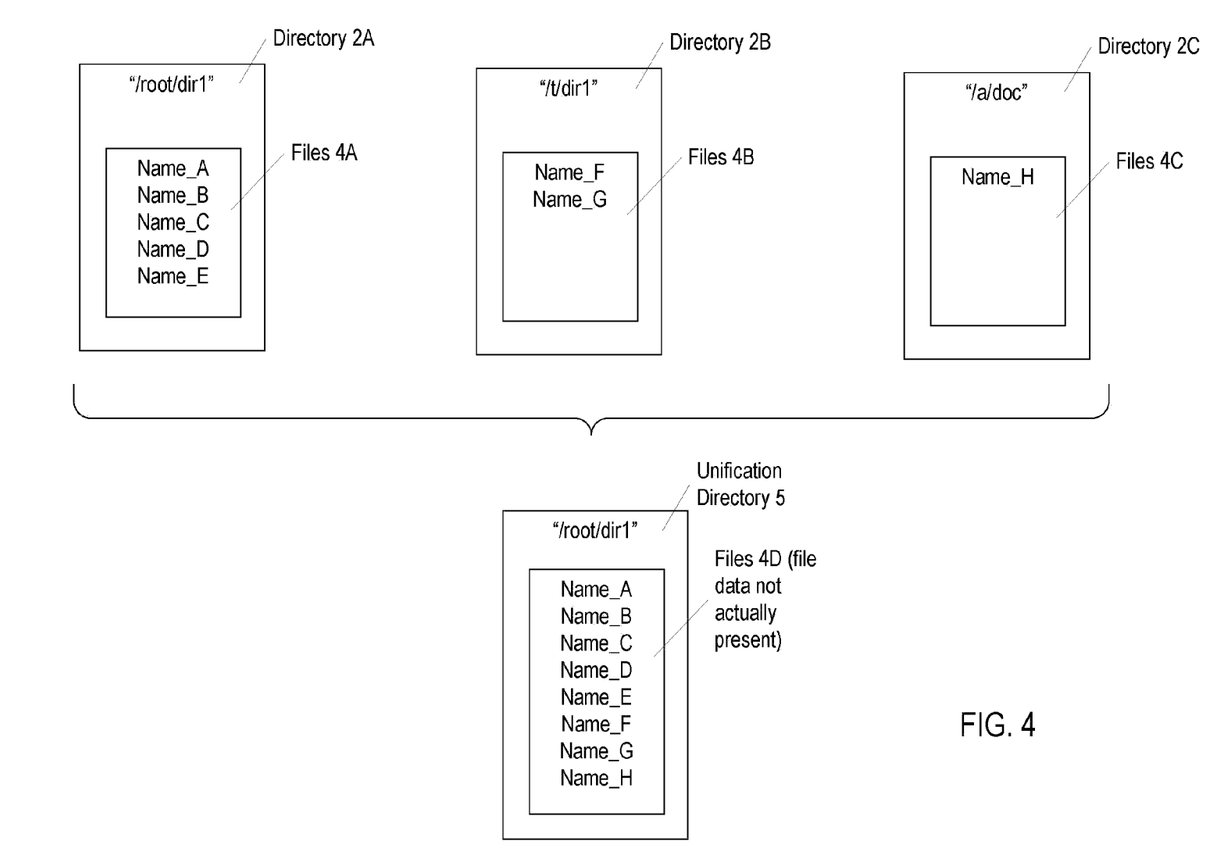
FIG. 4 illustrates an example of a unification directory accessible to obtain a listing of files in three underlying directories.

Various embodiments of a system and method for creating a unification directory to unify a group of directories are described herein. FIG. 4 illustrates an example of a group of directories including a directory 2A ("/root/dir1") containing files 4A, directory 2B ("/t/dir1") containing files 4B, and directory 2C ("/a/doc") containing files 4C. The system may enable the directories 2B and 2C to be unified with the directory 2A such that when directory operations are performed on the directory 2A, it appears to them that the directory 2A includes not only the files 4A, but also the files 4B and 4C. More particularly, the system may accomplish this by creating a unification directory 5 which includes directory entries corresponding to the names of the files 4A, 4B and 4C. However, the unification directory 5 does not contain complete copies of the files. For example, the actual file data of the files 4A, 4B and 4C may not be copied. Instead, the unification directory 5 is used to obtain a listing of the files 4A, 4B and 4C when needed, and the system then re-directs file operations to the real files in the individual directories 2A, 2B and 2C as necessary.

An administrator or configuration software may configure the system to inform the system that the directories 2B ("/t/dir1") and 2C ("/a/doc") should be merged into the directory 2A ("/root/dir1") so that it appears as if the directory 2A includes not only the files 4A, but also the files 4B and 4C. In some embodiments the unification of the directories 2A, 2B and 2C may also be configured with priority information assigning each of the directories 2A, 2B and 2C a priority relative to the other directories.

The system may create the unification directory 5 the first time it is needed. For example, the first time an application attempts to open the directory 2A ("/root/dir1"), the system may intercept the open request and check to see whether the unification directory 5 has been created yet. In response to determining that the unification directory 5 has not yet been created, the system may create a new directory to be used as the unification directory 5. The unification directory 5 may be created at any location within the file system. As used herein, the term "directory" refers to file system information or data structures created by a file system directory create operation. For example, in some Unix-based systems the unification directory 5 may be created by calling a mkdir( ) function provided by the file system. In some embodiments a directory may be implemented as a special type of file which lists directory entries identifying the files and sub-directories in the directory.

After the new unification directory 5 has been created, the system may add directory entries to the unification directory 5. For each file in each of the directories 2A, 2B and 2C, the system may add a corresponding directory entry to the unification directory 5. If more than one of the directories 2A, 2B and 2C has a file with a certain file name, then only one directory entry for that file name is added to the unification directory 5.

As discussed above, a directory entry corresponding to a particular file typically maps the name of the file to the mode number of an mode which stores metadata for the file. However, in some embodiments of the present system, the mode numbers specified by the directory entries in the unification directory 5 may not be used, but instead, only the file names specified by the directory entries in the unification directory 5 may be needed. The primary purpose of the unification directory 5 is simply to provide an efficient means for obtaining a list of file names of the files in the underlying individual directories 2A, 2B and 2C. The directory entries in the unification directory 5 may not be used to actually access any files in order to read data from or write data to the files. Instead, the system may re-direct requests to access particular files to the appropriate underlying directory. Thus, in some embodiments the directory entries in the unification directory 5 may not need to refer to valid inodes. In other embodiments the directory entries in the unification directory 5 may refer to valid inodes, but the inodes may not refer to any file data blocks.

Thus, the unification directory 5 may be created and the directory entries may be added to the directory in response to intercepting an open request to open the directory 2A ("/root/dir1") for the first time after the unification of the directories 2B and 2C with the directory 2A has been configured. The unification directory 5 may then be opened, and a handle or identifier to the unification directory 5 may be passed back in response to the open request. The calling application that generated the open request may then read a listing of files from the unification directory. The calling application may then use the listing of files in any of various ways. As an example, in one embodiment the calling application may be a file system program attempting to display a list of files in the directory 2A on a display screen. Thus, after obtaining the listing of files from the unification directory 5, the file system program may then pass the name of each file to a stat( ) function or other function to obtain various attributes regarding the file, such as the file length, modification date, etc.

Since it appears to the calling application that all of the files in the file listing are actually in the directory 2A, the stat( ) function calls or other file operation requests issued by the calling application may all be directed to the directory 2A, e.g., using the pathname of the directory 2A and the file name of each file. However, some of the files may actually be in the directory 2B or the directory 2C. Thus, the system may intercept the file operation requests and re-direct them to the appropriate directory as necessary. For example, if the calling application attempts to perform a file operation on the pathname "/root/dir1/Name_F" then the system may re-map the pathname to "/t/dir1/Name_F" since the "Name_F" file is actually in the directory 2B.

In various embodiments the system may determine which directory each file is actually located in using any of various techniques. For example, in some embodiments the system may simply access the directories unified by the unification directory 5 to attempt to find a file with the specified name. As noted above, the unification of the directories 2A, 2B and 2C may be configured with priority information assigning each of the directories 2A, 2B and 2C a priority relative to the other directories. Thus, the system may access the directories in the order of their priorities until a file with the specified name is found. Once found, the pathname specified by the file operation may be re-mapped to the pathname of the file in the directory in which the file was found. In other embodiments the system may be able to determine which directory each file is actually located in without having to access the directories in this manner. For example, in some embodiments the system may store mapping information useable to re-map file operations to the appropriate directories.

The unification directory 5 may be re-used from one directory operation to the next, as long as the underlying directories 2A, 2B and 2C have not changed. This may increase the efficiency of the system since the individual directories do not all have to be opened and read every time an operation on the directory 2A is performed. Instead, the previously created unification directory 5 may simply be opened and used to obtain the file listing again. In some embodiments the unification directory 5 may be created as a persistent directory in a file system. As used herein, the term "persistent directory" means a directory that can be re-used even after the power to the system has been turned off and then turned back on again.

Figure 5:
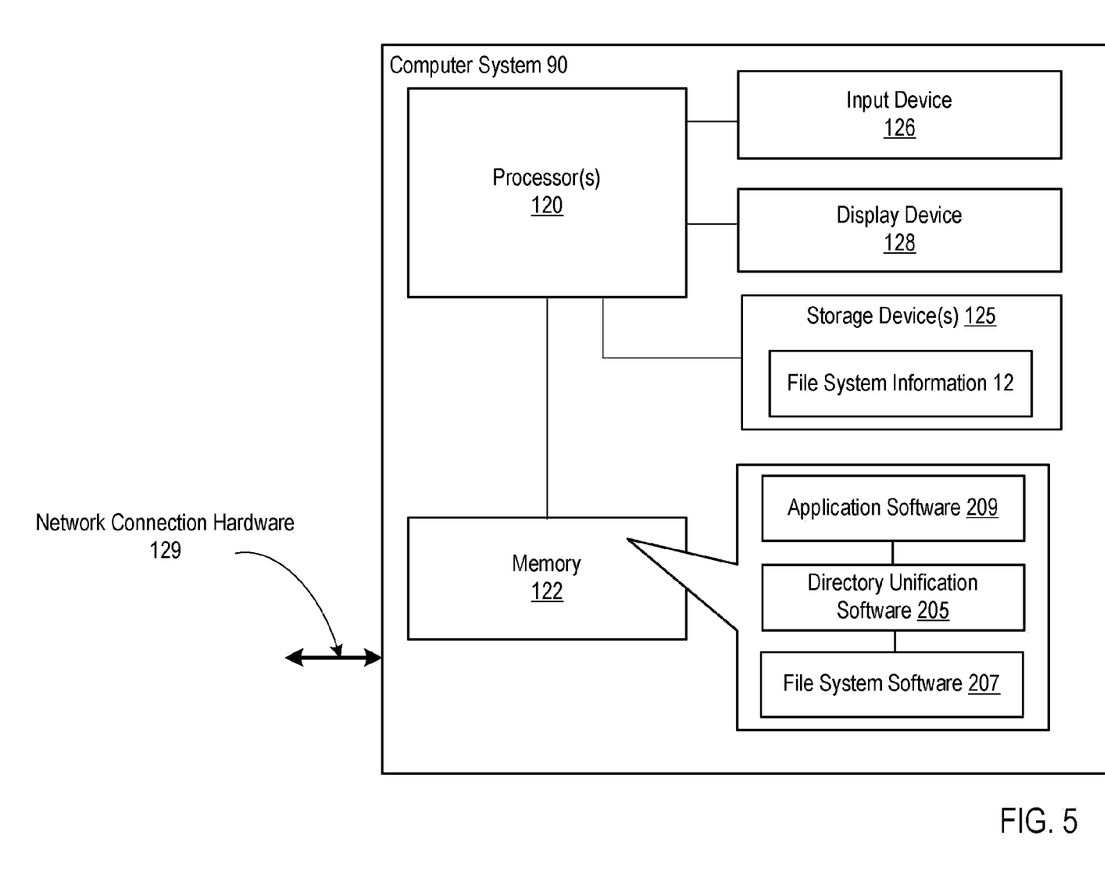
FIG. 5 illustrates an example of a computer system which may implement various embodiments of the methods described herein.

FIG. 5 illustrates an example of a computer system 90 which may implement various embodiments of the methods described herein. In various embodiments the computer system 90 may include any number of individual computers or nodes, e.g., one or more. Thus, the components illustrated in FIG. 5 may be implemented in one or more individual computers or nodes.

The computer system 90 may include one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. In particular, the memory 122 may store directory unification software 205. The directory unification software 205 may execute to perform various functions described herein, such as: configuring a group of directories to be unified; intercepting requests to access a directory that has been unified with others; creating a unification directory; intercepting a request to access a file in a directory that has been unified with others and re-directing the request to another directory; etc.

The memory 122 may also store file system software 207 which executes to perform various directory operations and file operations. The directory unification software 205 may call the file system software 207 to request various operations associated with a unification directory to be performed, such as creating the unification directory and removing the unification directory.

The directory unification software 205 may also intercept various directory operation and file operation requests that would normally be handled by the file system software 207. For example, as described above, in some embodiments the directory unification software 205 may intercept a request to open the directory 2A and create the unification directory 5 in response to the request (if it has not already been created). The directory unification software 205 may also intercept requests to access files in the directory 2A and re-direct the requests to files in the directories 2B and 2C as necessary.

The memory 122 may also store application software 209 which executes to perform various applications that require the use of files and directories. The application software 209 may not be aware of the directory unification functions implemented by the directory unification software 205.

It is noted that the processor 120 is representative of any type of processor. For example, in one embodiment, the processor 120 may be compatible with the x86 architecture, while in another embodiment the processor 120 may be compatible with the SPARC™ family of processors. Also, in some embodiments the computer system 90 may include multiple processors 120.

The computer system 90 also includes one or more storage devices 125. The storage device(s) 125 may store file system information 12, e.g., information which implements one or more file systems. The file system information 12 may include both the actual data for a plurality of files and metadata used to manage the files. In some embodiments, all of the directories that are unified by a unification directory such as described herein may be directories in the same file system. In other embodiments a unification directory may unify directories located in multiple file systems.

In various embodiments the storage devices 125 may include any of various kinds of storage devices. Examples of storage devices include disk storage units (e.g., devices including one or more disk drives), tape drives (e.g., devices operable to store data on tape cartridges), optical storage devices (e.g., devices operable to store data on optical media), flash memory storage devices, etc.

The computer system 90 may also include one or more input devices 126 for receiving user input, e.g., to the directory unification software 205 or other programs executing on the computer system 90. As one example, the directory unification software 205 may be operable to display a graphical user interface enabling an administrator to specify a group of directories to be unified. The input device(s) 126 may include any of various types of input devices, such as keyboards, keypads, microphones, or pointing devices (e.g., a mouse or trackball). The computer system 90 may also include one or more output devices 128 for displaying output, e.g., the graphical user interface of the directory unification software 205. The output device(s) 128 may include any of various types of output devices, such as LCD screens or monitors, CRT monitors, etc.

The computer system 90 may also include network connection hardware 129 through which the computer system 90 couples to one or more networks enabling communication with other computer systems. The network connection 129 may include any type of hardware for coupling the computer system 90 to a network, e.g., depending on the type of network. In various embodiments, the computer system 90 may be coupled to the other computer systems via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

The directory unification software 205 may enable an administrator or configuration software to configure a directory unification among a first file system directory and one or more other file system directories such that it appears as if the first file system directory includes not only its own files, but also the files of the one or more other file system directories. A directory operation on the first file system directory may subsequently be performed, where the directory operation requires a listing of the files in the first directory to be obtained. In a normal Unix-based file system, a listing of the files in a directory is typically obtained by simply opening the directory (e.g., using an open( ) function call) and then reading the list of files from the directory (e.g., using a readdir( ) function call). In this case, however, the directory unification software 205 may intercept the request to open the first directory and re-direct the request to a unification directory, according to the method illustrated in the flowchart of FIG. 6. The method of FIG. 6 may be implemented by the directory unification software 205 executing in conjunction with the file system software 207 on the computer system 90.

Figure 6:
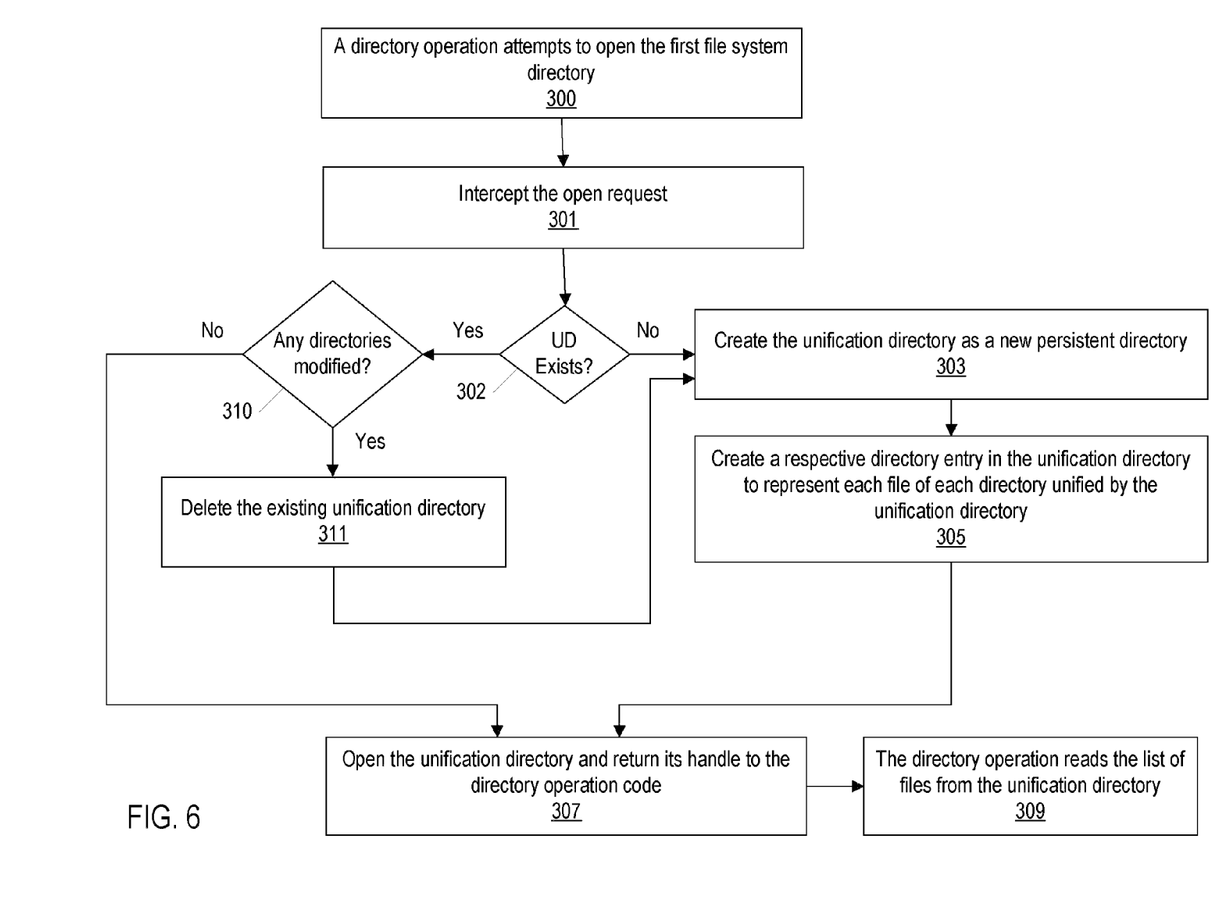
FIG. 6 is a flowchart diagram illustrating one embodiment of a method for intercepting a request to open a particular directory and re-directing the request to a unification directory.

As indicated in block 300, a directory operation may attempt to open the first directory. For example, the file system software 207 may provide an application programming interface (API) which includes an open( ) function or other function for opening a directory. Thus, in some embodiments the directory operation may attempt to open the first directory by calling the open( ) function and passing the pathname of the first directory as a parameter.

In various embodiments the directory operation that attempts to open the first directory may be any of various kinds of directory operations that require a listing of the files in the first directory to be obtained. As one example, the directory operation may be an operation for displaying the files in the first directory on a display screen of the computer system 90.

As indicated in block 301, the directory unification software 205 may intercept the request to open the first directory. For example, the directory unification software 205 may include software installed as a listener or filter on the open( ) function so that calls to the open( ) function can be intercepted. (The directory unification software 205 may be configured to intercept requests to open the first directory in response to the administrator or configuration software configuring the one or more other directories to be unified with the first directory.)

As indicated in block 301, the directory unification software 205 may then determine whether the unification directory for unifying the one or more other file system directories with the first directory already exists, e.g., if it was created in response to a previous directory operation performed on the first directory.

If the unification directory does not yet exist then the directory unification software 205 may create the unification directory, e.g., by calling a directory create operation provided by the API of the file system software 207. For example, in a Unix-based system, the unification directory may be created by calling a mkdir( ) function. In various embodiments the unification directory may be created anywhere within the file system, e.g., at any branch and location within the hierarchy of directories in the file system. As one example, if the first directory is named "/var/doc" then the unification directory may be created as "/t/var/doc". The unification directory is created as a persistent directory such that it can be subsequently re-used for later directory operations, as described below.

As indicated in block 305, after creating the new unification directory, the directory unification software 205 may then create a respective directory entry in the unification directory to represent each file of each directory unified by the unification directory. In other words, for each file in either the first directory or in one of the one or more other directories, a corresponding directory entry may be added to the unification directory. However, if more than one of the directories has a file with a certain file name, then only one directory entry for that file name is added to the unification directory.

As discussed above, it is not necessary to re-create the actual files of any of the directories in the unification directory. The unification directory is simply used to obtain a listing of the names of all the files in the first directory, as well as the names of all the files in the one or more other directories. Thus, in some embodiments it may be sufficient to simply create the directory entries for the files in the unification directory without creating any modes or other metadata structures for the files, and without creating any file data for the files. In other embodiments the directory unification software may create modes or other metadata structures for the files listed by the directory entries in the unification directory, but may not create any file data for the files.

As indicated in block 307, after the directory entries have been added to the unification directory, the directory unification software 205 may then open the unification directory and pass a handle or other reference to the open unification directory back to the directory operation which originally attempted to open the first file system directory. Thus, the functionality of creating the unification directory is transparent to the directory operation. It may appear to the directory operation that a handle to the first directory was returned in response to the open request, just as in a normal file system.

In block 309, the directory operation may then use the handle of the unification directory (or other reference to the unification directory) returned in block 307 to read the list of files from the unification directory. Thus, it may appear to the directory operation that the first directory includes all of the files actually in the first directory, as well as all of the files in the one or more other directories which are unified with the first directory, since the directory entries of the unification directory specify the names of all of these files.

After obtaining the listing of files from the unification directory, the directory operation may then perform further processing using the listing of files, e.g., depending on the type of directory operation. For example, if the directory operation is an operation for displaying the files on a display screen, the directory operation may call a stat( ) function or other function on each file to obtain various attributes of the file, such as the file length, creation time, etc. For each file, the directory operation may pass as a parameter to the stat( ) function the pathname of the file. Since it appears to the directory operation that all of the files are in the first directory, the directory operation may specify the pathname of each file as the name of the file appended onto the pathname of the first directory. As discussed above, the directory unification software 205 may intercept the stat( ) function calls and re-map the pathname so that the stat( ) calls for files that are actually located in directories other than the first directory are re-directed to the appropriate directory.

Suppose now that a subsequent directory operation is performed on the first directory, where the subsequent directory operation also requires a listing of files in the first directory to be obtained. Similarly as described above, the subsequent directory operation may attempt to open the first directory, and the directory unification software 205 may intercept the open request and check to determine whether the unification directory already exists, as shown in blocks 300, 301, and 302. The directory unification software 205 may know the name the unification directory would have and the location within the file system that it would be if it did exist. Thus, in some embodiments the directory unification software 205 may determine whether the unification directory already exists by simply checking to determine whether a directory with that name and at that location exists.

In this case the directory unification software 205 determines that the unification directory does already exist since it was created as a persistent directory in response to the previous directory operation, as described above. The directory unification software 205 may then check to determine whether any of the underlying directories unified by the unification directory (i.e., the first directory and the one or more other directories) have been modified since the time when the existing unification directory was created, as shown in block 310. If any of the underlying directories have been modified then the directory entries of the existing unification directory may no longer be valid, e.g., since one or more of the files they name may have been deleted from the underlying directory, or one or more new files may have been added to one or more of the underlying directories since the time when the unification directory was created. Thus, in this case, the directory unification software 205 may delete the existing unification directory as shown in block 311, and may re-create a new unification directory as shown in blocks 303 and 305 and as described above. Thus, the new unification directory will have a current listing of the files in the underlying directories.

If the directory unification software 205 determines that none of the underlying directories unified by the unification directory has been modified since the time when the existing unification directory was created then a valid listing of the files in the underlying directories can still be obtained from the existing unification directory. In this case, the existing unification directory is simply opened, and its handle is returned to the directory operation, which can then use the handle to obtain the file listing.

A directory can include both files and sub-directories. Although the discussion above refers mainly to files, it is noted that the discussion also applies to sub-directories. For example, suppose that a first directory includes a first set of files and a first sub-directory, and a second directory includes a second set of files and a second sub-directory. A unification directory such as described above may be used to unify the second directory with the first directory such that it appears to application programs that the first directory includes its own files and sub-directories, as well as the files and sub-directories of the second directory (i.e., includes the first and second set of files, as well as the first and second sub-directory).

The functionality of unifying sub-directories may be implemented similarly as described above with respect to files. For example, for each sub-directory in any of the underlying directories being unified by the unification directory, a corresponding entry representing the sub-directory may be added to the unification directory, e.g., where the entry specifies the name of the sub-directory. Thus, when the unification directory is read, e.g., using the readdir( ) function, the listing will include both the files and the sub-directories of the underlying directories.

In some embodiments the sub-directories may be added as file entries to the unification directory. This may not matter since the sub-directory entries are only present in the unification directory for listing purposes. Functions such as stat( ) or similar functions may later discover what type of object each entry in the unification directory refers to so that the object is used or displayed correctly. Similarly as discussed above, when another function attempts to actually use one of the sub-directories listed in the unification directory, the directory unification software 205 will re-direct the access request to the actual sub-directory in the underlying directory.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable to:
receive from an application a first request to open a first directory of a file system, wherein the first directory is a particular directory in a hierarchical tree of directories of the file system, wherein each respective directory of the hierarchical tree is specified by a respective pathname indicating the location of the directory within the hierarchical tree, wherein the first request indicates the pathname of the first directory, wherein the first directory is a directory of a group of directories including the first directory and one or more other directories of the hierarchical tree;
in response to the first request:
create a new directory at a particular location within the hierarchical tree, wherein the new directory is specified by a new pathname indicating the particular location within the hierarchical tree;
for each respective file of each directory of the group of directories, create a respective directory entry in the new directory to represent the respective file, wherein the respective file has a name, wherein the respective directory entry lists the name of the respective file in the new directory at the particular location within the hierarchical tree; and
return to the application a reference to the new directory;
wherein the program instructions are further executable to receive from the application a second request to open the first directory of the file system after said receiving the first request, and in response to the second request:
determine that the new directory already exists; and
return to the application a reference to the new directory;
wherein the program instructions are further executable to receive from the application a third request to open the first directory of the file system after said receiving the second request, and in response to the third request:
determine that the new directory already exists;
determine whether any of the directories of the group of directories has a modification time newer than a modification time of the new directory; and
in response to determining that at least one of the directories of the group of directories does have a modification time newer than the modification time of the new directory, re-create the new directory, wherein re-creating the new directory includes creating another new directory in the file system to replace the existing new directory and deleting the existing new directory from the file system.

2. The non-transitory computer-accessible storage medium of claim 1, wherein the program instructions are further executable to:
after said determining that the new directory already exists in response to the second request, determine whether any of the directories of the group of directories has a modification time newer than a modification time of the new directory;
wherein the program instructions are executable to perform said returning to the application the reference to the new directory in response to determining that none of the directories of the group of directories has a modification time newer than the modification time of the new directory.

3. The non-transitory computer-accessible storage medium of claim 1,
wherein the program instructions include program instructions of the application, wherein the program instructions are executable to cause the application to:
receive the reference to the new directory returned in response to the first request to open the first directory;
read a listing of file names from the new directory using the reference to the new directory, wherein the listing of file names specifies each file of each directory of the group of directories.

4. The non-transitory computer-accessible storage medium of claim 1,
wherein the new directory is created as a persistent directory.

5. The non-transitory computer-accessible storage medium of claim 1,
wherein the file system is a Unix-based file system;
wherein said-creating the new directory comprises invoking a mkdir( ) function provided by the file system.

6. The non-transitory computer-accessible storage medium of claim 1,
wherein the program instructions are executable to perform said creating the new directory in response to determining that a directory unifying the group of directories does not already exist.

7. The non-transitory computer-accessible storage medium of claim 1,
wherein the program instructions are executable to create the new directory without creating in the new directory complete copies of files in directories of the group of directories.

8. The non-transitory computer-accessible storage medium of claim 1,
wherein the program instructions are executable to create the new directory without copying data from files in directories of the group of directories.

9. A system comprising:
one or more processors; and
memory storing program instructions, wherein the program instructions are executable by the one or more processors to:

receive from an application a first request to open a first directory of a file system, wherein the first directory is a particular directory in a hierarchical tree of directories of the file system, wherein each respective directory of the hierarchical tree is specified by a respective pathname indicating the location of the directory within the hierarchical tree, wherein the first request indicates the pathname of the first directory, wherein the first directory is a directory of a group of directories including the first directory and one or more other directories of the hierarchical tree;

in response to the first request:
  create a new directory at a particular location within the hierarchical tree, wherein the new directory is specified by a new pathname indicating the particular location within the hierarchical tree;
  for each respective file of each directory of the group of directories, create a respective directory entry in the new directory to represent the respective file, wherein the respective file has a name, wherein the respective directory entry lists the name of the respective file in the new directory at the particular location within the hierarchical tree; and
  return to the application a reference to the new directory;

wherein the program instructions are further executable by the one or more processors to receive from the application a second request to open the first directory of the file system after said receiving the first request, and in response to the second request:
  determine that the new directory already exists; and
  return to the application a reference to the new directory;

wherein the program instructions are further executable by the one or more processors to receive from the application a third request to open the first directory of the file system after said receiving the second request, and in response to the third request:
  determine that the new directory already exists;
  determine whether any of the directories of the group of directories has a modification time newer than a modification time of the new directory; and
  in response to determining that at least one of the directories of the group of directories does have a modification time newer than the modification time of the new directory, re-create the new directory, wherein re-creating the new directory includes creating another new directory in the file system to replace the existing new directory and deleting the existing new directory from the file system.

10. The system of claim 9, wherein the program instructions are further executable by the one or more processors to implement:
after said determining that the new directory already exists in response to the second request, determine whether any of the directories of the group of directories has a modification time newer than a modification time of the new directory;
wherein the program instructions are executable by the one or more processors to perform said returning to the application the reference to the new directory in response to determining that none of the directories of the group of directories has a modification time newer than the modification time of the new directory.

11. A method comprising:
receiving from an application a first request to open a first directory of a file system, wherein the first directory is a particular directory in a hierarchical tree of directories of the file system, wherein each respective directory of the hierarchical tree is specified by a respective pathname indicating the location of the directory within the hierarchical tree, wherein the first request indicates the pathname of the first directory, wherein the first directory is a directory of a group of directories including the first directory and one or more other directories of the hierarchical tree;

in response to the first request:
  creating a new directory at a particular location within the hierarchical tree, wherein the new directory is specified by a new pathname indicating the particular location within the hierarchical tree;
  for each respective file of each directory of the group of directories, creating a respective directory entry in the new directory to represent the respective file, wherein the respective file has a name, wherein the respective directory entry lists the name of the respective file in the new directory at the particular location within the hierarchical tree; and
  returning to the application a reference to the new directory;

wherein the method further comprises receiving from the application a second request to open the first directory of the file system after said receiving the first request, and in response to the second request:
  determining that the new directory already exists; and
  returning to the application a reference to the new directory;

wherein the method further comprises receiving from the application a third request to open the first directory of the file system after said receiving the second request, and in response to the third request:
  determining that the new directory already exists;
  determining whether any of the directories of the group of directories has a modification time newer than a modification time of the new directory; and
  in response to determining that at least one of the directories of the group of directories does have a modification time newer than the modification time of the new directory, re-creating the new directory, wherein re-creating the new directory includes creating another new directory in the file system to replace the existing new directory and deleting the existing new directory from the file system.

12. The method of claim 11, further comprising:
after said determining that the new directory already exists in response to the second request, determining whether any of the directories of the group of directories has a modification time newer than a modification time of the new directory;
wherein said returning to the application the reference to the new directory is performed in response to determining that none of the directories of the group of directories has a modification time newer than the modification time of the new directory.

* * * * *